United States Patent [19]
Luck et al.

[11] 3,764,835
[45] Oct. 9, 1973

[54] DOUBLE SHIELDED SUPERCONDUCTING FIELD WINDING

[75] Inventors: David Lee Luck, Chesapeake, Va.; Philip Thullen, Dover, Mass.

[73] Assignee: Massachusetts Institute of Technology, Cambridge, Mass.

[22] Filed: May 25, 1972

[21] Appl. No.: 256,802

[52] U.S. Cl. .................................... 310/52, 310/10
[51] Int. Cl. ............................................ H02k 9/00
[58] Field of Search .......................... 310/10, 40, 52

[56] References Cited
UNITED STATES PATENTS

| | | | |
|---|---|---|---|
| 3,679,920 | 7/1972 | MacNab et al. | 310/10 |
| 3,242,418 | 3/1966 | Mela et al. | 310/10 UX |
| 3,368,087 | 2/1968 | Madsen | 310/10 |
| 3,648,082 | 3/1972 | MacNab et al. | 310/10 |
| 3,517,231 | 6/1970 | Massar | 310/52 |

Primary Examiner—D. F. Duggan
Attorney—Joseph S. Iandiorio et al.

[57] ABSTRACT

In a cryogenic electrical machine having a superconducting field winding mounted on a field structure and an armature mounted on an armature structure, the armature and the field structure carried one by the rotor, the other by the stator of the machine and an inner thermal radiation shield surrounding, mounted with and spaced from the superconducting field winding, an electrical-thermal-mechanical outer shield mounted with and spaced from the superconducting field winding and located between the superconducting field winding and the armature, the outer shield being at least co-extensive axially with the superconducting field winding and circumferentially continuous between the superconducting field winding and the armature and disposed in an ambient temperature region of the machine.

2 Claims, 4 Drawing Figures

DOUBLE SHIELDED SUPERCONDUCTING FIELD WINDING

FIELD OF INVENTION

This invention relates to an electrical-thermal-mechanical shield for the superconducting regions of a cryogenic electrical machine.

BACKGROUND OF INVENTION

In a cryogenic electrical machine having a superconducting field winding the field winding is typically surrounded by a thermal shield to insulate the supercooled region of the field windin. Although the mechanical support for the thermal shield and the shield itself are relatively delicate, i.e., they are thin in order to minimize heat conduction, they nevertheless have sufficient strength to withstand the mechanical forces generated by the eddy currents which flow in the thermal shield under steady state conditions. However under fault conditions the mechanical forces may reach seven or even ten times the normal forces and the heat caused by the increased eddy currents may be excessive to the extent that the thermal shield is unable to cope with them and may be destroyed. In conventional machines these eddy currents flow in the surface of the field structure which is composed of heavy steel and is able to accommodate the high forces and heat, but in cryogenic machines that steel is not required or desirable. Increasing the strength and thickness of the thermal shield and its mechanical supports increases its thermal conductance to the warm shaft and the supercooled regions and interferes with its essential function as an insulator for the supercooled region of the field windings. In addition to proper thermal and mechanical properties the shield must also have proper conductivity to give the shield an electrical time constant short enough for good damping of the rotor yet long enough to shield the supercooled region from transient, zero sequence and negative sequence magnetic fields. These qualities are explained in greater detail in the thesis submitted in partial fulfillment of the requirements for the degree of Doctor of Philosophy at the Massachusetts Institute of Technology by co-inventor David Lee Luck, of *Electromechanical and Thermal Effects of Faults Upon Superconducting Generators*, June 1971, available at the library of the Massachusetts Institute of Technology and a copy of which has been enclosed herewith for deposit in the U.S. Patent Office Scientific Library

SUMMARY OF INVENTION

It is therefore an object of this invention to provide a shielding device for the supercooled region of a cryogenic electrical machine having sufficient electrical conductivity to permit an electrical time constant short enough for good damping but long enough to shield the low temperature region from transient zero sequence and negative sequence magnetic fields, and sufficient mechanical strength to withstand forces generated under fault conditions, while also having sufficient mass, thermal capacity and thermal conductivity to absorb the heat generated during a fault condition without interfering with the function of thermally insulating the supercooled region.

It is a further object of this invention to provide such a device capable of having its thermal capacity significantly increased without significantly increasing the time constant.

The invention results from the discovery that the combination of the proper thermal and mechanical capacity to withstand fault conditions and the required electrical characteristics to provide good damping and shielding of transient, zero, and negative sequence magnetic fields can be realized in one shield and the further discovery that such a shield can be separate and distinct from the inner thermal shield whose desired and good insulative properties can thereby be preserved indifferent to its lack of high thermal capacity, electrical resistivity and mechanical strength.

The invention is utilized in a cryogenic electrical machine having a superconducting field winding mounted on the field structure and an armature mounted on an armature structure. The field winding and armature are carried one by the rotor and the other by the stator of the electrical machine. The machine also includes an inner thermal shield surrounding, mounted with, and spaced from the superconducting field winding. The invention features an electrical-thermal-mechanical outer shield mounted with and spaced from the superconducting field winding and located between the superconducting field winding and the armature. The outer shield is at least co-extensive axially with the superconducting field winding and circumferentially is continuous with the superconducting field winding and the armature and is disposed in an ambient temperature region of the machine.

DISCLOSURE OF PREFERRED EMBODIMENT

Other objects, features and embodiments will occur from the following description of a preferred embodiment and the accompanying drawings in which.

Figure 1:
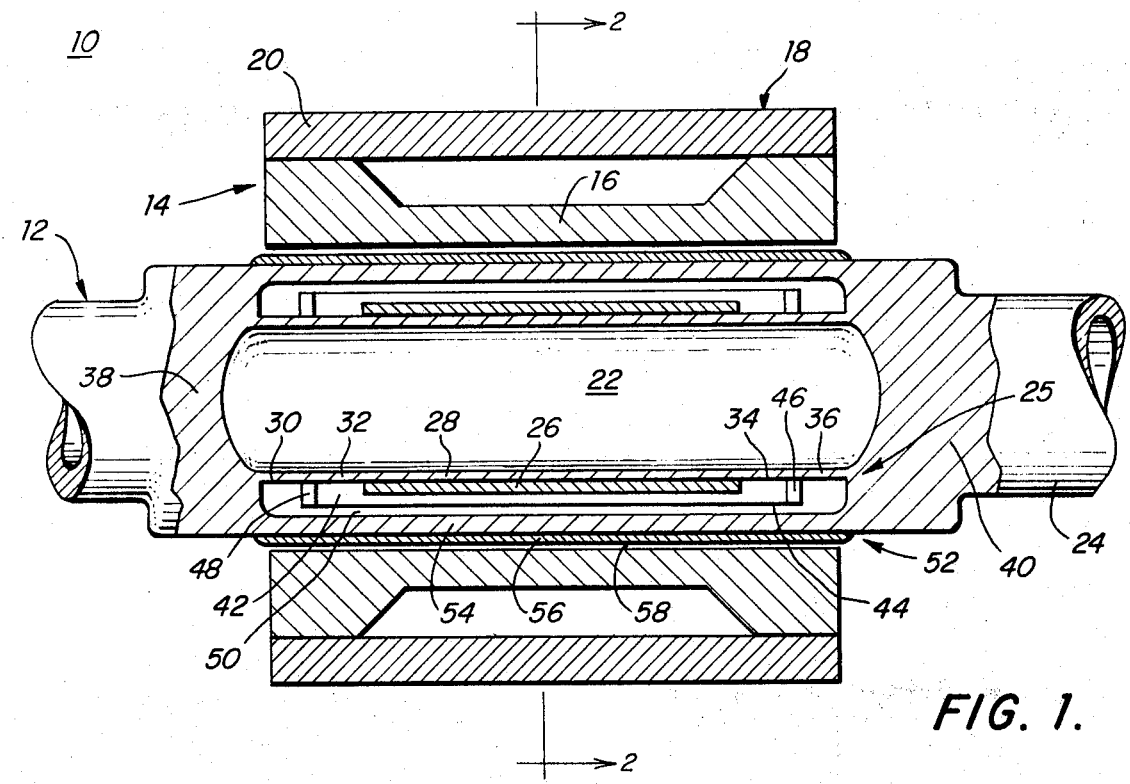
FIG. 1 is a schematic cross-sectional view taken through the central axis of a cryogenic electrical machine utilizing the electrical-thermal-mechanical shield according to this invention.

There is shown in FIG. 1 a cryogenic electrical machine 10 having a rotor 12 and stator 14; stator 14 includes an armature 16 and an armature structure 18, including laminated iron magnetic shield 20. The entire stator 14 is at ambient temperature. Rotor 12 includes a central vacuum cavity 22 formed in rotatable shaft 24; superconducting field winding 26 is included in a field structure 25 which includes field winding support 28 interconnected, by means of thermal distance pieces 30, 32 and 34, 36, with the ends 38 and 40, respectively, of shaft 24. The superconducting field winding 26 is typically cooled to 4.2° K by means of a liquid helium cryogenic cooling system, which is not a part of this invention and is omitted for clarity. The superconducting field winding 26 is disposed in vacuum chamber 42 enclosed by inner thermal shield 44 having end pieces 46 and 48, which are interconnected with thermal distance pieces 30, 32, 34, 36. Typically field winding support 28 and thermal distance pieces 30, 32, 34, 36 may all be integral parts of shaft 24. Thermal distance pieces 30, 32, 34 and 36 function to thermally shield ambient temperature and supercooled temperature regions from one another; provide mechanical support for the superconducting field winding and thermal shield, and transmit the steady state machine torque and may be made of austinitic stainless steel or other material with low thermal conductivity, high strength and high modulus of elasticity. Surrounding inner thermal shield 44 is a second vacuum compartment 50. Surrounding superconducting field winding 26 and fixed to rotor 12 is outer shield 52 which includes two layers; one layer 54 performs primarily the mechanical-thermal function and may be integrally formed with shaft 24. The other layer 56 is mounted on layer 54 and functions primarily as an electrical shield. Layer 56, the electrical shield, extends into gap 58 between stator 14 and rotor 12.

Figure 2:
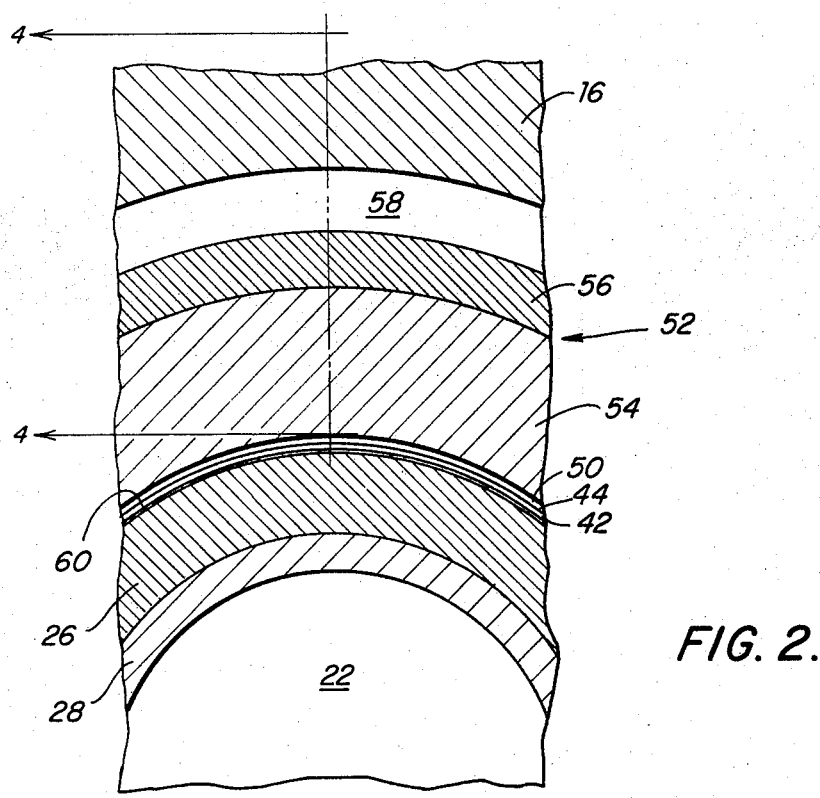
FIG. 2 is a portion of a cross-sectional view taken along lines 2—2 of FIG. 1.

The construction of outer shield 52 is shown in more detail in FIG. 2 where like parts have been given like numbers. The electrical shield, layer 56, is typically formed of phosphor bronze, beryllium, copper or other copper alloys and is located on the side of shield 52 towards gap 58 and armature 16 and away from superconducting field winding 26. The mechanical-thermal layer 54 is typically formed of stainless steel and is on the side of outer shield 52 facing toward field winding 26. Both layers 54 and 56 are at ambient temperature as is gap 58 and armature 16. Inner thermal shield 44 is typically approximately 20° K and field winding 26 is typically at 4.2° K as when it is being supercooled by a system which uses liquid helium. A containment vessel 60 is used to enclose field winding 26.

Typical dimensions of a shield for a one thousand MVA superconducting generator are as follows: armature 16 has an inner radius of 19.5 inches and an outer radius of 25.0 inches and is approximately 121 inches in length; laminated iron magnetic shield 20 has an inner radius of 29 inches and an outer radius of 41.7 inches; field winding support 28 has an inner radius of 8.95 inches and an outer radius of 10 inches; superconducting field winding 26 has an inner radius of 10 inches and an outer radius of 12 inches; containment vessel 60 has a radius of 12.0 inches; inner thermal shield 44 has a radius of 12.1 inches; in outer electrical-thermal-mechanical shield 52 layer 54 has an inner radius of 12.2 inches and an outer radius of 16.0 inches and layer 56 has an inner radius of 16.0 inches and an outer radius of 17.6 inches; the axial length of shield 52 is at least co-extensive with that of superconducting field winding 26 and may extend as far as or beyond each end of armature 16 and extends circumferentially continuously about rotor 12. Further analysis of the problem in greater detail is contained in the thesis, cited supra, submitted in partial fulfillment of the requirements for the degree of Doctor of Philosophy at the Massachusetts Institute of Technology by co-inventor David Lee Luck, *Electromechanical and Thermal Effects of Faults Upon Superconducting Generators*, June 1971, available at the library of the Massachusetts Institute of Technology, a copy of which is submitted herewith for deposit in the U.S. Patent Office Scientific Library.

A shield according to this invention may be designed by determining its materials of construction and its geometry. The field of choices is constrained by the following considerations: it must have a given skin depth $\delta$ for penetration of magnetic fields; it must have a given time constant for the decay of electrical currents within it; it must attenuate time varying magnetic fields by a given amount; the losses associated with attenuation of externally applied time varying magnetic fields should be small; it should withstand the combined mechanical stresses due to electrical torques and centrifugal forces without damage; it should withstand normal electrical forces without excessive deflection; it should not be in mechanical resonance with the applied time varying mechanical forces; and it should have sufficient thermal capacity to withstand electrical faults without overheating. Calculations justifying the shield design listed in Table II-3 and shown in FIG. II-7 of the Luck thesis follow.

The skin depth $\delta$ is expressed:

$$\delta = \sqrt{2/(\omega_x \cdot \mu_o \cdot \sigma)}$$

where
$\delta$ = the skin depth
$\sigma$ = the electrical conductivity of layer 56 or layer 54
$\mu_o$ = the magnetic permeability of layer 56 or layer 54
$\omega_x$ = the frequency of the applied magnetic field (assumed to vary harmonically)

For example for a layer of phosphor bronze A (95% Cu, 5% Sn)

$\sigma = 9.35\ [(\text{meter})/(\text{Ohm})\ (\text{millimeter})^2]$ $\mu_o = 4\pi \times 10^{-7}\ [(\text{Volt})\ (\text{second})/(\text{Amp})\ (\text{meter})]$ typical values for $\omega_x$ would be $\omega_x = 378[1/(\text{Sec})]$ or $\omega_x = 756\ [1/(\text{Sec})]$ corresponding values of $\delta$ are:

$\delta(378) = 0.835$ inches or $\delta(756) = 0.59$ inch for a layer 54 of stainless steel (18% Cr, 8% Ni)

$\sigma = 1.38\ [\text{meter}/(\text{ohm})\ (\text{millimeter})^2]$ $\delta(378) = 2.17$ inches or $\delta(756) = 1.54$ inches If $\Delta > \delta$ the layer is considered thick. If $\Delta < \delta$ the layer is considered thin. If $\Delta = \delta$, exact formulations are required. In the thick and thin cases approximations may be used.

The time constant $T_{si}$ for a layer is expressed:

$$T_{si} = \tfrac{1}{2}\ \Delta\sigma\mu_o R_i\ (1 + \Delta/2R_o)$$

where $i$ denotes inner radius of the layer and $o$ denotes outer radius of the layer. The thickness $\Delta$ of layer 56 and of layer 54 may now be chosen as layer 56 $\Delta = 1.6$ inches and $T_{si} = 0.159$ seconds and
layer 54 $\Delta = 3.8$ inches and $T_{si} = 0.0555$ seconds and
combined $T_{si} = 0.2145$ seconds.

The desirable value, from stability considerations for shield 52 for $T_{si}$ is 0.212 seconds. This provides optimum damping for a swing frequency of 1.6Hz.

Fields at a frequency of $\omega = 756$ (1/Sec) are frequently encountered (negative sequence fields). At these frequencies both the layer 56 and layer 54 are considered thick.

layer 56 bronze $\Delta = 1.6$ inches $\delta\ (756) = 0.59$ inch
layer 54 stainless $\Delta = 3.8$ inches $\delta\ (756) = 1.54$ inches For these cases:

$$Ka = 2\sqrt{2} \cdot \frac{\delta}{\sqrt{R_i R_o}} \cdot e^{-\frac{\Delta}{\delta}}$$

and $Ka = 0.0066$ for layers 56
$Ka = 0.0264$ for layers 54

If $\delta > \Delta$ the formulation for $Ka$ becomes:

$$Ka = 1/[(1 + (\omega T_{st})^2)^{1/2}]$$

The losses in the layers should be kept small. For a thick layer the losses are:

$$\rho = (4\pi l)/\sigma\delta) \cdot R/[1 \pm (R/T_{sh})^{2n}]^2 \cdot H_{\omega lo} n$$

where $H_{\omega lo}$ is the external field with no shield present, and n is the number of pole pairs in the machine. The expressions for the various torques developed are quite complex and are set forth in detail in the Luck thesis, see specifically expressions A-33 through A-37. For the 1,000 mva machine described in the Luck thesis where $n = 1$ and $H_{\omega lo} = 0.1H$ producing power then $\rho = 141,000$ watts. The formulation is more complex in the case of thin layers.

Fault torques are given by the expressions A-33 through A-37 in the Luck thesis. These forces plus the centrifugal stress given by $$\sigma = \rho\omega^2 R^2$$

are applied simultaneously to the layers. They must be combined to find the principal stresses. This is done by using a geometrical construction known as Mohre's Circle. These forces, torques and stresses are tabulated at page 58 of the Luck thesis.

The deflection of the layers can be calculated by use of equation A-66 in the Luck thesis and is tabulated on page 58 of that thesis.

The natural frequencies of the layers are given by equation A-67 in the Luck thesis and are tabulated on page 58 of that thesis.

The thermal capacity is given by $$\Delta v = mc\Delta T$$

where
$\Delta v$ = change in internal energy of the layers
$m$ = mass of the layers
$c$ = specific heat of the layers
$\Delta T$ = change in temperature of the layers
for bronze $c = 0.09$ (Btu/$1b°$ F)
for stainless $c = 0.12$ (Btu/$1b°$ F)

The energy input to the layers is calculated by knowing the value of the unbalance current $I_2$. The energy input is proportional to $I_2{}^2 t$. Values of $I_2{}^2 t$ corresponding to varying values of $\Delta T$ are given on page 59 of the Luck thesis.

Figure 3:
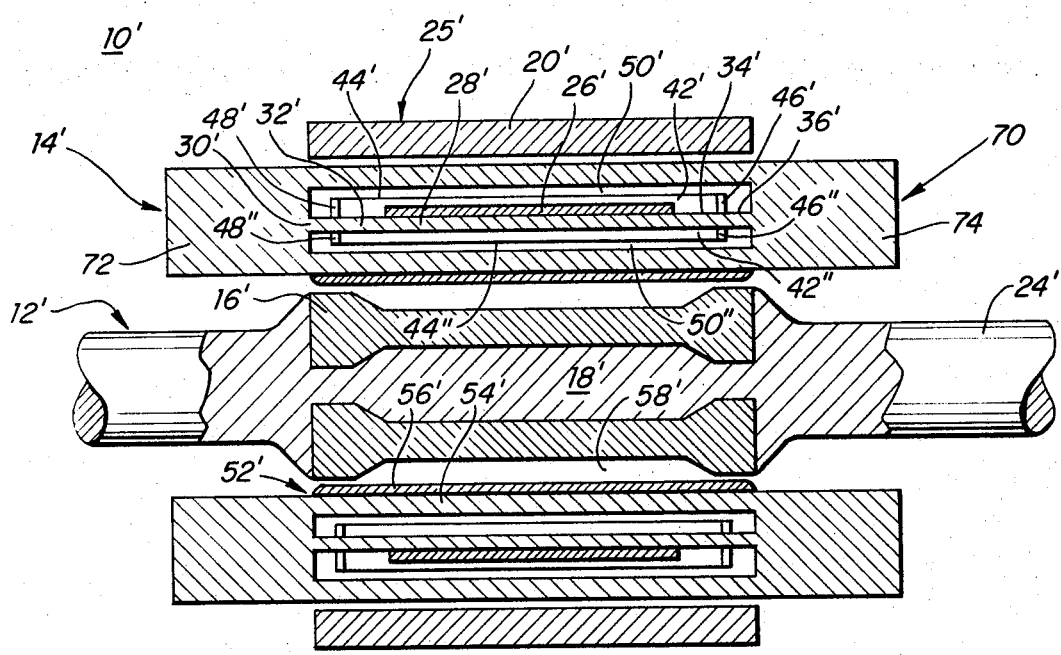
FIG. 3 is a view similar to FIG. 1 in which the superconducting field winding is stationary and mounted on an external annular stator which surrounds the armature on an internal rotor.

The field of this invention is not limited to use in machines in which the superconducting field winding is rotating nor in machines in which the superconducting field winding is in the center and the armature surrounds it. For example, in FIG. 3 where like parts have been shown with like numbers primed and double primed with respect to FIGS. 1 and 2, a cryogenic electrical machine is shown in which rotor 12' is still centrally located within and surrounded by stator 14' but in machine 10' rotor 12' includes simply shaft 24' with armature 16' rather than the field winding carried on it as pictured in FIGS. 1 and 2. Thus the armature structure in machine 10' includes simply part 18' which is formed integral with shaft 24'. In contrast stator 14' includes field winding structure 25' which includes iron magnetic shield 20' and support frame 70 in which is disposed superconducting field winding 26' mounted on field winding support 28' interconnected by means of thermal distance pieces 30' and 32' and 34' and 36' with the end pieces 72 and 74 of support frame 70. There are two inner thermal shields 44' and 44" surrounding superconducting field winding 26'. Inner thermal shield 44' supported on end pieces 46', 48' is separated from superconducting field winding 26' by vacuum 42' and from frame 70 by vacuum 50'. The second inner thermal shield 44" is mounted on end pieces 46" and 48" and is separated from field winding support 28' by vacuum 42" and from frame 70 by vacuum 50". The outer electrical-thermal-mechanical shield 52' is mounted on frame 70 of stator 14' with its thermal-mechanical layer 54' illustrated as formed integrally with frame 70 and its electrical layer 56' mounted externally thereon facing gap 58' and armature 16' on internal rotor 12'. It can be seen by comparing FIGS. 1 and 3 that outer shield 52' is mounted with the superconducting field winding and with its thermal-mechanical layer 54' facing toward the superconducting field winding and its electrical layer 56' facing toward the armature. If in FIGS. 1 and 3 rotor 12' was held stationary and stator 14' was made to be rotated so as to become the rotor the position and orientation of shield 52' and the layers would be the same.

Figure 4:
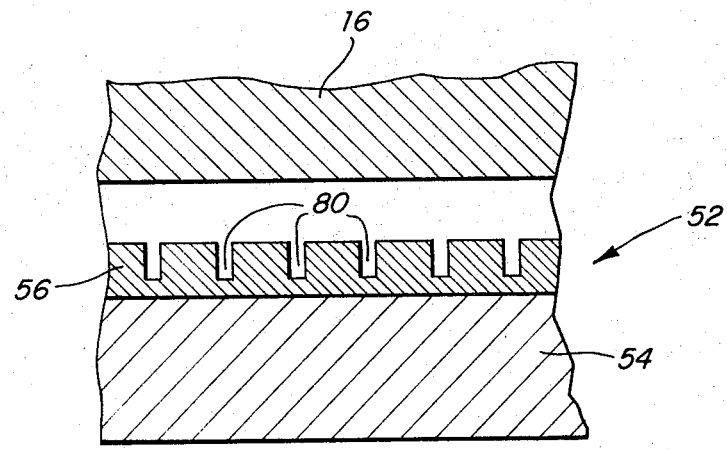
FIG. 4 is a partial cross-sectional view taken along lines 4—4 of FIG. 2.

It may be necessary to increase the thermal capacity of outer shield 52 without also increasing the electrical time constant. One way of accomplishing this result is to provide, FIG. 4, circumferential slots 80 in layer 56 which functions primarily as an electrical shield. The use of slots 80 enables the thickness of the shield to be increased and to thus increase the thermal capacity of the shield within a thermal skin depth and yet the slots keep the longitudinal electrical resistance of the shield from simultaneously decreasing and thereby keeps the electrical time constant from increasing.

Other embodiments will occur to those skilled in the art and are within the following claims.

What is claimed is:

1. In a cryogenic electrical machine having a superconducting field winding mounted on a field structure and an armature mounted on an armature structure carried one by the rotor the other by the stator of the machine and an inner thermal shield surrounding, mounted with, and spaced from the superconducting field winding an electrical-thermal-mechanical outer shield mounted with and spaced from said superconducting field winding and located between said superconducting field winding and said armature, said outer shield being at least co-extensive axially with said superconducting field winding and circumferentially continuous between said superconducting field winding and said armature and disposed in an ambient temperature region of said machine, said outer shield including circumferential slots on one of its sides to provide significantly increased thermal capacity without significantly increased axial electrical conductivity.

2. In a cryogenic electrical machine having a superconducting field winding mounted on a field structure and an armature mounted on an armature structure carried one by the rotor the other by the stator of the machine and an inner thermal shield surrounding, mounted with, and spaced from the superconducting field winding an electrical-thermal-mechanical outer shield mounted with and spaced from said superconducting field winding and located between said superconducting field winding and said armature, said outer shield being at least co-extensive axially with said superconducting field winding and circumferentially continuous between said superconducting field winding and said armature and disposed in an ambient temperature region of said machine, said outer shield including a first layer and a second layer said first layer operating primarily as an electrical shield and said second layer primarily as a thermal and mechanical shield and said slots are disposed in said first layer.

* * * * *